United States Patent [19]
Gill et al.

[11] Patent Number: 5,614,160
[45] Date of Patent: Mar. 25, 1997

[54] COMPOSITE SILICATE MATERIALS

[75] Inventors: Petra M. Gill, Warminster, Pa.; Eric von Rehren Borgstedt, Louisville; Raymond P. Denkewicz, Jr., La Grange, both of Ky.

[73] Assignee: PQ Corporation, Valley Forge, Pa.

[21] Appl. No.: 258,466

[22] Filed: Jun. 10, 1994

[51] Int. Cl.$^6$ .................................................. C01B 33/32
[52] U.S. Cl. .......................... 423/332; 423/333; 423/334; 106/600; 106/604; 23/295 R; 23/300; 23/302 T
[58] Field of Search ...................... 106/600, 604; 423/332, 333, 334; 502/407; 264/12, 13; 23/295 R, 300, 302 R, 302 T

[56] References Cited

U.S. PATENT DOCUMENTS

| | | | |
|---|---|---|---|
| 2,640,756 | 6/1953 | Wills | 23/111 |
| 2,840,456 | 6/1958 | Gooding | 423/333 |
| 4,585,642 | 4/1986 | Rieck | 423/333 |
| 4,664,839 | 5/1987 | Rieck | 252/175 |
| 4,806,327 | 2/1989 | Rieck et al. | 423/332 |
| 4,820,439 | 4/1989 | Rieck | 252/135 |
| 4,950,310 | 8/1990 | Rieck et al. | 34/295 R |
| 4,959,170 | 9/1990 | Ulrich et al. | 252/135 |
| 5,183,651 | 2/1993 | Schimmel et al. | 423/334 |
| 5,211,930 | 5/1993 | Schimmel et al. | 423/333 |
| 5,236,682 | 8/1993 | Schimmel et al. | 423/334 |
| 5,268,156 | 12/1993 | Schimmel et al. | 423/334 |
| 5,308,596 | 5/1994 | Kotzian et al. | 423/333 |
| 5,356,607 | 10/1994 | Just | 423/334 |

FOREIGN PATENT DOCUMENTS

| | | | |
|---|---|---|---|
| 0578986 | 1/1994 | European Pat. Off. . | |
| 2549167 | 5/1977 | Germany | 423/333 |
| 1096215 | 6/1984 | U.S.S.R. | 423/334 |

OTHER PUBLICATIONS

McCulloch, L., "A New Highly Silicious Soda–Silica Compound", *J. Am. Chem. Soc.* 75, 2453 (1952). No month available.

"Hydrated Crystalline Alkali Metal Polysilicates", *The Chemistry of Silica*, pp. 158–171, (1979). No month available.

R.K. Iler, "Ion Exchange Properties of a Crystalline Hydrated Silica", *J. Colloid Sci.*, 19, pp. 648–657 (1964). No month available.

J. Williamson et al., "The crystallisation of $Na_2O \cdot 2SiO_2$ glasses", *Physics and Chemistry of Glasses*, vol. 7, No. 4, (Aug. 1966).

*Primary Examiner*—Paul Marcantoni
*Attorney, Agent, or Firm*—Ratner & Prestia

[57] ABSTRACT

The present invention pertains to a crystalline hydrated layered sodium silicate/amorphous sodium silicate composite material with predetermined hardness ion sequestration properties achieved by control of the process for forming the material, and a process for making the material. The process for producing the crystalline hydrated layered sodium silicate/amorphous sodium silicate composite consists of producing a crystalline sodium disilicate by heating a sodium silicate at a specified time and temperature. The resulting material may include amorphous material, and the crystalline sodium disilicate can be either alpha-phase or delta-phase disilicate. This crystalline sodium disilicate is then hydrolyzed with up to 50.0 milliequivalents per gram of either $H_3O^+$ ions or $OH^-$ ions. The resulting material can sequester $Ca^{2+}$ ions, $Mg^{2+}$ ions, or both, depending on the results desired, processing conditions, and starting materials used.

19 Claims, No Drawings

5,614,160

COMPOSITE SILICATE MATERIALS

FIELD OF THE INVENTION

This invention relates to composite materials comprised of a crystalline hydrated layered alkali silicate and an amorphous alkali silicate that exhibit the ability to reduce the activity of hardness ions in laundry wash water. In particular, this invention relates to crystalline hydrated layered alkali silicate/amorphous alkali silicate composite materials useful as detergent ingredients.

BACKGROUND OF THE INVENTION

It is known that hard water ions, specifically calcium and magnesium, adversely affect the activity of soaps and detergents. These ions deactivate detergents and can form undesirable precipitates. Thus it is desirable to remove these ions prior to reaction with the detergent. One way to do this is to soften the water prior to introduction into a washing machine. In many parts of the world, this is impractical or impossible, but in most parts of the world it is expensive. Another approach to remove hard water ions is by reaction with another material in situ in the washer. Materials useful for removing hard water ions include alkali silicates (non-crystalline silicates, crystalline silicates and zeolites), particularly hydrated layered alkali silicates.

Hydrated layered silicates are materials chemically comprising $SiO_2$ organized into layers (sheets) having a negative charge, with alkali cations for charge compensation, and water located between these layers. Hydrated layered silicates have been known for a number of years, either synthetically produced or naturally occurring (McCulloch J. Am. Chem. Soc. 75, 2453 (1952)). The $SiO_2/Na_2O$ ratios of these silicates range from 4 to 20. The first synthetic hydrated layered silicate, having a $SiO_2/Na_2O$ ratio of 4, was reported by Wills in 1953 (U.S. Pat. No. 2,640,756). This synthetic hydrated layered silicate was claimed to be useful as an ion exchange material, specifically for calcium. However, the structure of the synthetic hydrated layered silicate prepared by Wills was not disclosed. In 1972, a naturally occurring tetrasilicate ($SiO_2/Na_2O=4$) was reported by Johan and Maglione (Johan and Maglione, Bull. Soc. Fr. Mineral. Crystallogr. 95, 371 (1972)). The structure of this material was identified as a hydrated layered silicate, and the name kanemite was given to this mineral. In *The Chemistry of Silica* 1979 and J. Colloid Sci 19, 7, 648 (1964), Iler concluded from the results of Johan and Maglione that the synthetic hydrated layered silicate claimed by Wills in 1953 was kanemite. Duplication of Wills' invention, as demonstrated in an example herein, supports Iler's conclusions. Furthermore, Iler reported that crystalline hydrated layered alkali silicates have the ability to ion exchange their sodium ions and protons with other metal ions or organic ions. Iler's observations are consistent with Wills' experimental findings on the calcium ion exchange ability of kanemite materials. The synthesis of kanemite has also been reviewed by Beneke and Lagaly (Beneke and Lagaly, Amer. Mineral. 62, 763 (1977)).

In recent years the use of crystalline layered silicates, especially crystalline disilicates, as detergent builders has been suggested (see U.S. Pat. Nos. 4,585,642; 4,806,327; 4,950,310; 4,820,439; 4,664,839; and 4,959,170). These crystalline disilicates were synthesized and reported as early as 1966 (Williamson and Glasser, Physics and Chemistry of Glasses, Vol. 7, No. 4, August, 1966). While these patents claim that crystalline disilicates function when incorporated into detergents, the disclosed crystalline layered silicates have not been accepted readily by the worldwide detergent industry due to their poor ability to remove hardness ions from wash water at temperatures below about 30° C.

Furthermore, there are circumstances where it may be necessary or desirable to remove only one hardness ion or the other ($Ca^{2+}$ or $Mg^{2+}$). Some detergent formulations have been developed which work synergistically with one hardness ion. Accordingly, it may be undesirable to remove that ion, or it may be desirable to reduce it to a particular concentration to optimize detergent performance while removing the other ion. Finally, where only one ion is present in water of a particular geographic region, it is only that ion (either calcium or magnesium) which can be removed from the wash water. In the past, tailoring builder materials to selectively sequester hardness ions was difficult or impossible.

It is an object of this invention to provide a composite material comprising a hydrated layered alkali silicate and an amorphous alkali silicate that is more suitable as a detergent ingredient than previously suggested materials that it would replace. A further object of this invention is to provide a detergent composition that includes a hydrated layered silicate/amorphous silicate composite that reduces the activity of hardness ions in the wash water without producing the detrimental precipitates of these ions produced by some other detergent additives including sodium carbonate. It is a still further object of this invention to provide the chemistry and the processing necessary to tailor the detergent builder and ion sequestering properties of these hydrated layered silicate/amorphous silicate composite materials.

SUMMARY OF THE INVENTION

The present invention pertains to a crystalline hydrated layered sodium silicate/amorphous sodium silicate composite material with predetermined hardness ion sequestration properties achieved by control of the process for forming the material, and a process for making the material. The process for producing the crystalline hydrated layered sodium silicate/amorphous sodium silicate composite consists of producing a crystalline sodium disilicate by heating a sodium silicate at a specified time and temperature. The resulting material may include amorphous material, and the crystalline sodium disilicate can be either alpha-phase or delta-phase disilicate. This crystalline sodium disilicate is then hydrolyzed with up to 50.0 milliequivalents of either $H_3O^+$ ions or $OH^-$ ions per gram of anhydrous material. The resulting material can sequester $Ca^{2+}$ ions, $Mg^{2+}$ ions, or both, depending on the results desired.

DETAILED DESCRIPTION OF THE INVENTION

The crystalline hydrated layered alkali silicate/amorphous alkali silicate composite products of this invention have superior detergent building properties compared to their individual components, which indicates the materials of the present invention are not a simple combination of crystalline hydrated layered alkali silicate and amorphous alkali silicate. The crystalline hydrated layered alkali silicate portion of the composite product belongs to a family of materials also known as: hydrated layered silicates; hydrated sheet (alkali) silicates; crystalline (alkali) layered silicates; and crystalline (alkali) silicates. The term "hydrated layered silicate" will be used herein to refer to the crystalline hydrated layered alkali silicate portion of the composite of our invention.

The composite materials of the present invention are useful as detergent builders. As used herein, the term "builder" is intended to refer to materials which have the ability to remove hardness ions from solution. Detergent formulations generally comprise at a minimum, a surfactant (or emulsifier) and a builder. Such formulations may also include adjuncts such as enzymes, brighteners, perfumes, bactericides, thickeners, stabilizers, citrates, phosphates, carbonates, polycarboxylates, and nitrilotriacetic acid (NTA), some of which also function as builders in that they remove hardness ions from solution.

Hydrated layered silicates have the ability to sequester hardness ions from solution. Amorphous alkali silicates are well known for their ability to sequester magnesium ions, to buffer, and to supply free alkalinity to the laundry wash water. The superior sequestration properties of the composite product prepared according to the process of this invention are believed to be due to the formation of a unique structure including a crystalline hydrated layered alkali silicate and an amorphous alkali silicate. The sequestration properties of the composite products can be tailored by altering the processes used to prepare the materials and thus the ultimate structure of the resulting materials.

Naturally occurring kanemite is a hydrated layered silicate with weakly bound water and an ability to bind hardness ions (as was shown in U.S. Pat. No. 2,640,756 and reported by Iler, J. Colloid Sci. 19, 7, 648 (1964)). It is a tetrasilicate, and therefore has a $SiO_2/Na_2O$ mole ratio of 4, although this varies somewhat depending upon the history of the material. We have found that synthetic composites including kanemite and amorphous sodium silicate have properties that distinguish them as detergent builders from previously suggested layered silicates when used alone. This has been achieved by controlling the chemistry and the processing of these hydrated layered silicate/amorphous silicate composites.

The products of this invention may be prepared by spray drying liquid sodium silicate having a solids content between 5 and 50 weight % to produce a hydrous polysilicate having a 16 to 22% water content. The spray dried product is then crystallized at temperatures of 600° to 800° C. for 15 minutes to 24 hours, depending on the process equipment and conditions. Finally, hydrated layered silicate/amorphous silicate composites of the present invention can be prepared by converting the resulting materials in an alkaline or acidic media followed by drying. The concentration of hydronium ions (i.e., $H_3O^+$) in the acidic media or hydroxyl ions (i.e., $OH^-$) in the alkaline media employed will dictate the final detergent builder properties of the resulting material.

Alternatively, amorphous sodium silicate glass may be used as a starting material to produce the products of the present invention. The glass is ground and mixed with water using about 80% glass and 20% water by weight. The mixture is then calcined at 600° to 800° F. for 15 to 24 hours to form a crystalline mass. This can then be pulverized and treated with an alkaline or acidic media as outlined above.

The composite materials of the present invention possess superior properties as compared with prior art detergent builder/sequestering materials. These composite materials remain free flowing powders under ambient or high humidity conditions. Under similar humidity conditions, prior art detergent builders such as crystalline disilicates become a dilatent mass. In addition, the hydrated layered silicate composite materials of this invention are more effective in reducing the activity of hardness ions in laundry wash water than previously reported kanemite or crystalline disilicate materials. This is observed in a pH range of 8 to 10, the operating pH range of most detergents currently in use. The detergent building properties of the hydrated layered silicate/amorphous silicate composite materials of the present invention can be adjusted to maximize performance in varying wash conditions. The inventors believe such adaptability has not heretofore been known.

The exact $SiO_2/Na_2O$ ratio of the hydrated layered silicate included in the composite of the present invention depends on the history of the material and the extent of any hydrolysis that has taken place. The X-ray diffraction pattern of the composite material indicates that it includes hydrated layered silicate with the same crystalline structure as the mineral kanemite. Kanemite has a distinctive X-ray diffraction pattern summarized in Table 1 below. The data in Table 1 is summarized from Joint Committee on Powder Diffraction Standards (JCPDS) File #25-1309. The mineral kanemite has been reported to have a $SiO_2/Na_2O$ ratio of 4. However pure kanemite produced in accordance with the teachings of Beneke and nagaly (see above) was shown to have a $SiO_2/Na_2O$ ratio of only 3.36. This material gave an X-ray diffraction pattern indicating pure kanemite which shows that the $SiO_2/Na_2O$ ratio of pure kanemite may be variable.

TABLE 1

| X-ray Diffraction Pattern of Kanemite | |
| --- | --- |
| d-spacing (A) | $I/I_o$ |
| 10.3 | 100 |
| 5.13 | 50 |
| 4.01 | 100 |
| 3.64 | 50 |
| 3.44 | 90 |
| 3.16 | 70 |
| 3.09 | 70 |
| 2.480 | 80 |
| 2.386 | 60 |
| 2.073 | 40 |
| 1.995 | 50 |
| 1.929 | 40 |
| 1.464 | 40 |
| 1.191 | 40 |

The composition of kanemite with a $SiO_2/Na_2O$ ratio of 4 is 56.08% $SiO_2$, 14.49% $Na_2O$, and 29.43% water on a weight basis. When heated to 150° C., the weight lost due to water removal is approximately 16.82%. An additional 8.41% weight reduction occurs when water is driven off at temperatures between 150° C. and 280° C. The remaining 4.2% water can be driven off at temperatures above 280° C. These dehydrated forms of kanemite also have distinctive X-ray diffraction patterns which can be found in JCPDS Files #27-709 ($NaHSi_2O_5$—$H_2O$) and #27-708 ($NaHSi_2O_5$) which are incorporated herein by reference.

Synthetic kanemite (which will be referred to herein simply as "kanemite" since it possesses the same X-ray diffraction pattern as natural kanemite) can be prepared by various methods including the hydrolysis of various species of crystalline sodium disilicates or the base exchange of disilicic acids. Kanemite can also be recovered as the crystallization product of sodium silicate solutions that have been stored for long periods of time at ambient conditions or for shorter periods of time at elevated temperatures. Seeding of the sodium silicate solutions is advantageous if kanemite production is desirable.

Synthesis of the hydrated layered silicate/amorphous silicate composites of the present invention can be accomplished by the following process: First, a solution of sodium silicate is prepared by dissolving sodium silicate glass in water. One standard method for making sodium silicate glass is by the fusion of a sodium source and a silica source at temperatures between 1100° C. to 1400° C. The $SiO_2$/$Na_2O$ ratio of the amorphous glass can be controlled by varying the ratio of the sodium source and the silica source present during the fusion process. The amorphous sodium silicate glass is then dissolved in soft water at ambient conditions or at elevated temperatures and pressures to yield liquid sodium silicate having a solids content between 5% and 50%. The liquid silicate is then spray dried to produce a hydrous polysilicate having a 16 to 22% water content. Again, the ratio of the polysilicate will depend on the initial sodium and silica sources used for production. The hydrous polysilicate is then crystallized by heating to temperatures of 600° C. to 800° C. for 15 minutes to 24 hours, depending on the process equipment, the temperature, and whether the material is seeded. Finally, the crystallized products are slurried in an alkaline or acidic media followed by drying. Under these process conditions, only crystalline disilicate material will form. No other crystalline material will be produced.

The concentration of the ions (hydronium or hydroxyl) in the media will dictate the final detergent builder properties, including the $SiO_2$/$Na_2O$ ratio of the composite material. The composite material can either be dried by filtering the slurry and drying the filter cake at temperatures up to 100° C. or by spray drying at temperatures up to 120° C.

The resulting composite material provides excellent builder behavior for detergents. For example, the composite material does not cake when exposed to atmospheric conditions. The material remains a free flowing powder when exposed to 80% relative humidity for a period of at least three months. Ordinary crystalline disilicates become a dilatent mass within a few weeks at such humidity. The buffering capacity of the composite material is excellent. Buffering takes place in an attractive pH range for effective laundering, i.e., a pH range of about 8 to 10.

The composite material of the present invention has a high ion binding capacity and will reduce the activity of both hardness water ions ($Ca^{2+}$ and $Mg^{2+}$) in wash water if desired. This is superior to presently used detergent builders such as Zeolite NaA and delta-phase disilicate. Zeolite NaA primarily exchanges calcium, and delta-phase disilicate requires much higher pH ranges, generally 10 to 12, to provide effective hardness ion binding capacity. Further, delta-phase disilicate may dissolve at these high pH conditions to produce undesirable precipitates of calcium and magnesium silicates or hydroxides.

The hydrated layered silicate/amorphous silicate composite detergent builder of the present invention can be formulated into detergent formulations with most commonly used ingredients to form stable compositions. Artionic, non-ionic and zwiterionic surfactants can be used in detergent formulations. Co-builders such as crystalline alumino silicates including clays and zeolites such as Zeolite NaA, Zeolite MAP (maximum aluminum NaP phase), organic sequesterants and condensed polyphosphates are also compatible with the material of the present invention, as are other conventional detergent ingredients. Spray drying, agglomeration and dry blending methods can be utilized to form stable and efficient detergents containing the products of the present invention.

Further properties and advantages of the hydrated layered silicates/amorphous silicate composite compositions of the present invention are illustrated in the following examples.

EXAMPLES

The proportions are in parts by weight (pbw), percent weight (%), parts per million (ppm), moles or equivalents unless otherwise indicated. The notation, $DI^2$-water, refers to double distilled water.

The calcium and magnesium ion exchange rates and capacities were determined for various products and are reported as the calcium exchange rate (CER), calcium exchange capacity (CEC), magnesium exchange rate (MgER), and magnesium exchange capacity (MgEC). The results shown in the tables are expressed as milligrams (mg) of $CaCO_3$ per gram (g) of anhydrous product for both calcium and magnesium. For brevity, the calcium and magnesium exchange capacities of the products of this invention, as described in the disclosure and recited in the claims, can also be (and frequently are) expressed in units of milliequivalents of Ca (or Mg) per gram of anhydrous product.

The calcium and magnesium performance (CER, CEC, MgER, and MgEC) were determined as follows. The product (0.5 grams on an anhydrous basis) was reacted with 250 milliliters (ml) of a solution containing either calcium or magnesium ions. The concentration of these solutions was 1000 ppm expressed as $CaCO_3$. The stirred reaction mixture was buffered at a pH of 10 with 2 to 3 ml of a solution of $NH_4Cl$ and $NH_4OH$. The temperature was held at 25° C. (unless otherwise noted) during the exchange reaction. An aliquot (15 ml) was removed after 2 minutes to determine the calcium and magnesium exchange rates (CER and MgER) by pulling the suspension through a 1.0 micron filter into a syringe. A second aliquot was removed at 15 minutes to determine the calcium and magnesium exchange capacities (CEC and MgEC).

The filtrates from the calcium exchange reaction were analyzed for calcium in solution as follows. A 5 ml aliquot of filtrate was combined with 5 ml of 1 molar NaOH and about 100 milligrams of hydroxy naphthol blue indicator. A titration to a definite blue end point was carried out with 0.005 molar ethylene diaminotetracetic acid (EDTA), and the volume of EDTA used was recorded.

A blank titration using 5 ml of the 1000 ppm $CaCO_3$ solution was carried out using the same method and the volume of EDTA was recorded. Filtrates from the magnesium exchange reaction were analyzed in the same manner except that 5 ml of an $NH_4OH/NH_4Cl$ buffer and about 100 mg of Erichrome Black T (3-hydroxy-4-[(1-hydroxy-2-naphthalenyl)azo]-7-nitro-1-naphthalenesulfonic acid monosodium salt, available from Sigma Chemical Co. of St. Louis, Mo.) were used.

The rates and capacities for calcium and magnesium ions removed by the product were calculated as mg of $CaCO_3$/g of anhydrous product as follows:

$$\frac{\text{milligrams } CaCO_3}{\text{gram anhydrous product}} = \frac{(B-V) \cdot M \cdot FW \cdot 50}{[(100-LOI)/100] \cdot W}$$

B=volume of EDTA for blank titration (ml)
V=volume of EDTA for sample titration (ml)
M=Molarity of EDTA solution
FW=Formula Weight of $CaCO_3$ (100.1 g/mole)
LOI=Loss on Ignition of product at 800° C. (%)
W=Weight of product (grams)

Phase identification of the examples was determined using standard X-ray diffraction techniques. A 5–50 two-theta scan was used.

Example 1

Delta-phase; $SiO_2/Na_2O=2$

Delta-phase sodium disilicate was prepared according to a process reported in the literature. A spray dried sodium silicate having 2 moles of $SiO_2$ for each mole of $Na_2O$ and 18% water was heated to 700° C. for 1 hour. The crystalline mass was pulverized by ball milling. The product was identified by X-ray diffraction as delta-phase sodium disilicate.

Example 2

Delta-phase and amorphous; $SiO_2/Na_2O=2.4$

A product including delta-phase sodium disilicate was prepared according to the following process. A spray dried sodium silicate having 2.4 moles of $SiO_2$ for each mole of $Na_2O$ and 18% water was heated to 700° C. for 1 hour. The crystalline mass was pulverized by ball milling. The product was identified as including a delta-phase sodium disilicate by X-ray diffraction.

Example 3

Delta-phase and amorphous; $SiO_2/Na_2O=3.22$

A product including delta-phase sodium disilicate was prepared according to the following process. A spray dried sodium silicate having 3.22 moles of $SiO_2$ for each mole of $Na_2O$ and 18% water was heated to 700° C. for 1 hour. The crystalline mass was pulverized by ball milling. The product was identified by X-ray diffraction as including a delta-phase sodium disilicate.

Example 4

Alpha-phase; $SiO_2/Na_2O=2$

Alpha-phase sodium disilicate was prepared according to the following process. A spray dried sodium silicate having 2 moles of $SiO_2$ for each mole of $Na_2O$ and 18% water was heated to 800° C. for 6 hours. The crystalline mass was pulverized by ball milling. The product was identified by X-ray diffraction as alpha-phase sodium disilicate.

Example 5

Delta-phase and amorphous; $SiO_2/Na_2O=1.7$

A product including delta-phase sodium disilicate was prepared according to the following process. A mixture comprised of 8 pbw of an amorphous ground silicate glass having 1.7 moles of $SiO_2$ for each mole of $Na_2O$ and 2 pbw of $DI^2$-water was heated to 700° C. for 1 hour. The crystalline mass was pulverized by ball milling. The product was identified by X-ray diffraction as including a delta-phase sodium disilicate.

Example 6

Delta-phase and amorphous; $SiO_2/Na_2O=1.5$

A product including delta-phase sodium disilicate was prepared according to the following process. A mixture comprised of 8 pbw of an amorphous ground silicate glass having 1.5 moles of $SiO_2$ for each mole of $Na_2O$ and 2 pbw of $DI^2$-water was heated to 700° C. for 1 hour. The crystalline mass was pulverized by ball milling. The product was identified by X-ray diffraction as including a delta-phase sodium disilicate.

Examples 7–16

Composite material of the present invention; $SiO_2/Na_2O=2$; ions: $H_3O^+$

A composite material was prepared according to the process of the present invention as follows. Twenty grams of crystalline delta-phase disilicate from Example 1 was slurried in 300 milliliters of $DI^2$-water containing various amounts of hydrochloric acid (HCl), as described in Table 2, for 2 minutes followed by filtering and drying at ambient conditions. The product was pulverized by ball milling. X-ray diffraction revealed that a kanemite phase was present.

As explained, the product is milled after both before and after hydrolyzation. Although ball milling is specified, any appropriate type of milling may be used. Preferably, such milling will reduce the average particle size of the product to less than 200 microns prior to hydrolyzation and to less than 75 microns after hydrolyzation. This will produce material with sufficient surface area to allow diffusion of the hydrolyzing agent during hydrolysis, and sufficient surface area to provide hardness ion removal upon introduction into wash water. If the particles are too large before hydrolysis, only the outer particle layers may be hydrolyzed resulting in partially hydrolyzed product with reduced effectiveness. Similarly, if the particles are too large after hydrolysis, there may be insufficient surface area to allow effective hardness ion removal, resulting in a need for higher doses of material, and increased cost.

Elemental analysis indicated that the $SiO_2/Na_2O$ ratio of the products depended on the concentration of hydronium ions used during the hydrolysis step, as may be seen from Table 2. Hardness ion binding performance was observed to vary with the $SiO_2/Na_2O$ ratio of the resulting product (which was a function of the $H_3O^+$ concentration), as observed in Table 2.

TABLE 2

Hydrated Layered Silicates Synthesized by the Hydrolysis of Delta Phase Product with a $SiO_2/Na_2O$ of 2.0 from Example 1

| Example No. | Amount of product from Example 1 (grams) | meq $H_3O^+$ per gram of anhydrous product from Example 1 (acid used was 2N HCl) | $SiO_2/Na_2O$ | LOI % | CER | CEC | MgER | MgEC |
|---|---|---|---|---|---|---|---|---|
| 7 | 20.0 | 0.00 | 2.20 | 13.98 | 228 | 259 | 253 | 335 |
| 8 | 20.0 | 0.24 | 2.35 | 15.72 | 249 | 272 | 273 | 345 |
| 9 | 20.0 | 0.60 | 2.45 | 22.60 | 238 | 291 | 331 | 370 |
| 10 | 20.0 | 1.20 | 2.42 | 22.60 | 225 | 274 | 192 | 293 |
| 11 | 20.0 | 2.40 | 2.74 | 31.07 | 241 | 294 | 225 | 324 |

TABLE 2-continued

Hydrated Layered Silicates Synthesized by the Hydrolysis of Delta Phase Product with a $SiO_2/Na_2O$ of 2.0 from Example 1

| Example No. | Amount of product from Example 1 (grams) | meq $H_3O^+$ per gram of anhydrous product from Example 1 (acid used was 2N HCl) | $SiO_2/Na_2O$ | LOI % | CER | CEC | MgER | MgEC |
|---|---|---|---|---|---|---|---|---|
| 12 | 20.0 | 3.00 | 2.93 | 27.16 | 150 | 275 | 122 | 184 |
| 13 | 20.0 | 3.60 | 3.13 | 27.70 | 166 | 284 | 110 | 164 |
| 14 | 20.0 | 4.20 | 3.00 | 26.00 | 183 | 286 | 112 | 192 |
| 15 | 20.0 | 4.80 | 3.25 | 23.68 | 197 | 292 | 30 | 95 |
| 16 | 20.0 | 9.60 | 21.4 | 15.52 | 47 | 52 | 60 | 22 |

Examples 17–29

Composite material of the present invention; $SiO_2/Na_2O=2.4$; ions: $H_3O^+$

A composite material was prepared according to the process of the present invention as follows. Twenty grams of material from Example 2 was slurried in 300 milliliters of $DI^2$-water containing various amounts of HCl, as described in Table 3 for 2 minutes followed by filtering and drying at ambient conditions. The product was pulverized by ball milling. X-ray diffraction revealed that a kanemite phase was present.

Elemental analysis indicated that the $SiO_2/Na_2O$ ratio of the products depended on the concentration of hydronium ions used during the hydrolysis step, as may be seen from Table 3. Hardness ion binding performance was observed to vary with the $SiO_2/Na_2O$ ratio of the resulting product (which was a function of the $H_3O^+$ concentration), as observed in Table 3. Comparing Examples 17–29 to Examples 7–16, it can be concluded that the hardness ion binding performance is dependent on both the composition of the starting materials and the hydrolysis conditions under which the materials are processed.

Examples 30–42

Composite material of the present invention; $SiO_2/Na_2O=3.22$; ions: $H_3O^+$

A composite material was prepared according to the process of the present invention as follows. Twenty grams of material from Example 3 was slurried in 300 milliliters of $DI^2$-water containing various amounts of HCl, as described in Table 4 for 2 minutes followed by filtering and drying at ambient conditions. The product was pulverized by ball milling. X-ray diffraction revealed that a kanemite phase was present.

Elemental analysis indicated that the $SiO_2/Na_2O$ ratio of the products depended on the concentration of hydronium ions used during the hydrolysis step, as may be seen from Table 4. Hardness ion binding performance was observed to vary with the $SiO_2/Na_2O$ ratio of the $H_3O^+$ resulting product (which was a function of the 3 concentration), as observed in Table 4. Comparing Examples 30–42 to Examples 7–29, it can be concluded that the hardness ion binding performance is dependent on both the composition of the starting materials and the hydrolysis conditions under which the materials are processed, since the sequestering rate and capacity differ in materials with very similar or identical $SiO_2/Na_2O$ ratios.

TABLE 3

Hydrated Layered Silicates Synthesized by the Hydrolysis of Delta Phase Product with a $SiO_2/Na_2O$ of 2.4 from Example 2

| Example No. | Amount of product from Example 2 (grams) | meq $H_3O^+$ per gram of anhydrous product from Example 2 (acid used was 2N HCl) | $SiO_2/Na_2O$ | LOI % | CER | CEC | MgER | MgEC |
|---|---|---|---|---|---|---|---|---|
| 17 | 20.0 | 0.00 | 3.94 | 25.60 | 206 | 271 | 63 | 163 |
| 18 | 20.0 | 0.20 | 4.5 | 25.44 | 221 | 295 | 161 | 270 |
| 19 | 20.0 | 0.40 | 4.49 | 25.73 | 197 | 282 | 172 | 292 |
| 20 | 20.0 | 0.60 | 4.52 | 25.44 | 192 | 282 | 72 | 137 |
| 21 | 20.0 | 0.80 | 4.62 | 25.51 | 161 | 270 | 62 | 142 |
| 22 | 20.0 | 1.00 | 4.62 | 25.83 | 223 | 283 | 62 | 137 |
| 23 | 20.0 | 1.50 | 4.72 | 25.8 | 208 | 284 | 78 | 143 |
| 24 | 20.0 | 2.00 | 4.77 | 25.57 | 171 | 271 | 52 | 157 |
| 25 | 20.0 | 3.00 | 4.92 | 24.95 | 201 | 280 | 37 | 82 |
| 26 | 20.0 | 4.00 | 5.05 | 25.02 | 197 | 271 | 52 | 131 |
| 27 | 20.0 | 5.00 | 5.39 | 24.22 | 159 | 239 | 48 | 93 |
| 28 | 20.0 | 7.50 | 11.86 | 14.54 | 72 | 87 | 47 | 52 |
| 29 | 20.0 | 10.00 | 125.45 | 12.42 | 27 | 27 | 12 | 17 |

TABLE 4

Hydrated Layered Silicates Synthesized by the Hydrolysis of Delta Phase Product with a $SiO_2/Na_2O$ of 3.22 from Example 3

| Example No. | Amount of product from Example 3 (grams) | meq $H_3O^+$ per gram of anhydrous product from Example 3 (acid used was 2N HCl) | $SiO_2/Na_2O$ | LOI % | CER | CEC | MgER | MgEC |
|---|---|---|---|---|---|---|---|---|
| 30 | 20.0 | 0.00 | 4.40 | 19.35 | 249 | 284 | 15 | 49 |
| 31 | 20.0 | 0.20 | 4.52 | 19.6 | 235 | 279 | 24 | 24 |
| 32 | 20.0 | 0.40 | 4.66 | 19.13 | 224 | 282 | 24 | 35 |
| 33 | 20.0 | 0.60 | 5.08 | 21.84 | 224 | 258 | 24 | 44 |
| 34 | 20.0 | 0.80 | 5.02 | 21.67 | 230 | 275 | 24 | 39 |
| 35 | 20.0 | 1.00 | 5.16 | 20.01 | 211 | 269 | 20 | 20 |
| 36 | 20.0 | 1.50 | 5.37 | 18.75 | 204 | 276 | 5 | 20 |
| 37 | 20.0 | 2.00 | 5.68 | 19.69 | 215 | 254 | 15 | 20 |
| 38 | 20.0 | 3.00 | 5.73 | 18.21 | 187 | 231 | 10 | 49 |
| 39 | 20.0 | 4.00 | 7.19 | 20.19 | 132 | 185 | 15 | 34 |
| 40 | 20.0 | 5.00 | 9.35 | 16.35 | 54 | 122 | 29 | 29 |
| 41 | 20.0 | 7.50 | 51.39 | 9.96 | 10 | 10 | 5 | 5 |
| 42 | 20.0 | 10.00 | 89.86 | 10.25 | 2 | 2 | 5 | 5 |

Examples 43–52

Composite material of the present invention; $SiO_2/Na_2O=2$; ions: $H_3O^+$

A composite material was prepared according to the process of the present invention as follows. Twenty grams of crystalline alpha-phase disilicate from Example 4 was slurried in 300 milliliters of $DI^2$-water containing various amounts of HCl, as described in Table 5, for 2 minutes followed by filtering and drying at ambient conditions. The product was pulverized by ball milling. X-ray diffraction revealed that a kanemite phase was present.

Elemental analysis indicated that the $SiO_2/Na_2O$ ratio of the hydrated layered silicate composite products synthesized depended on the concentration of hydronium ions used during the hydrolysis step. Hardness ion binding performance was observed to vary with the $SiO_2/Na_2O$ ratio of the hydrated layered silicate composite product, as observed in Table 5. It can be concluded from this series of examples and the previous Examples 7–42, and especially with Tables 2 and 3, that the hardness ion binding performance differs for the same $SiO_2/Na_2O$ ratio product. Therefore, the hardness ion binding performance is dependent not only on the composition, but also the crystalline phase of the starting material and the hydrolysis conditions.

Examples 53–56

Composite material of the present invention; $SiO_2/Na_2O=2$; ions: $OH^-$

A composite material was prepared according to the process of the present invention as follows. Twenty grams of crystalline delta-phase disilicate from Example 1 was slurried in 300 milliliters of $DI^2$-water containing various amounts of sodium hydroxide (NaOH) pellets, as described in Table 6, for 2 minutes followed by filtering and drying at ambient conditions. The product was pulverized by ball milling. X-ray diffraction revealed that a kanemite phase was present.

Elemental analysis indicated that the $SiO_2/Na_2O$ ratio of the hydrated layered silicate composite products synthesized depended on the concentration of hydroxyl ions used during the hydrolysis step. Hardness ion binding performance was observed to vary with the $SiO_2/Na_2O$ ratio of the hydrated layered silicate composite product, as observed in Table 6. It can be concluded from this example and the previous Examples 7–52, that the conversion of crystalline disilicates to composites with variable and controllable sequestering properties can be accomplished in either acidic or basic media.

TABLE 5

Hydrated Layered Silicates Synthesized by the Hydrolysis of Alpha Phase Product with a $SiO_2/Na_2O$ of 2.0 from Example 4

| Example No. | Amount of product from Example 4 (grams) | meq $H_3O^+$ per gram of anhydrous product from Example 4 (acid used was 2N HCl) | $SiO_2/Na_2O$ | LOI % | CER | CEC | MgER | MgEC |
|---|---|---|---|---|---|---|---|---|
| 43 | 20.0 | 0.00 | 3.69 | 14.57 | 53 | 108 | 120 | 235 |
| 44 | 20.0 | 0.40 | 3.40 | 14.64 | 28 | 78 | 115 | 225 |
| 45 | 20.0 | 0.80 | 3.63 | 17.12 | 48 | 103 | 100 | 205 |
| 46 | 20.0 | 1.20 | 3.47 | 14.64 | 47 | 97 | 95 | 220 |
| 47 | 20.0 | 1.60 | 3.74 | 15.34 | 47 | 87 | 100 | 190 |
| 48 | 20.0 | 2.00 | 3.94 | 16.77 | 63 | 113 | 90 | 180 |
| 49 | 20.0 | 2.50 | 4.09 | 19.81 | 88 | 148 | 135 | 205 |
| 50 | 20.0 | 5.00 | 4.44 | 20.03 | 48 | 108 | 70 | 130 |
| 51 | 20.0 | 7.50 | 5.41 | 18.52 | 38 | 73 | 45 | 60 |
| 52 | 20.0 | 10.0 | 27.468 | 13.20 | 23 | 28 | 20 | 30 |

TABLE 6

Hydrated Layered Silicates Synthesized by the Hydrolysis of Delta Phase Product with a $SiO_2/Na_2O$ of 2.0 from Example 1

| Example No. | Amount of product from Example 1 (grams) | meq OH⁻ per gram anhydrous product from Example 1 (base used was NaOH pellets) | $SiO_2/Na_2O$ | LOI % | CER | CEC | MgER | MgEC |
|---|---|---|---|---|---|---|---|---|
| 53 | 20.0 | 1.0 | 3.24 | 26.72 | 265 | 325 | 251 | 303 |
| 54 | 20.0 | 2.0 | 3.22 | 26.80 | 277 | 337 | 265 | 311 |
| 55 | 20.0 | 20.0 | 2.91 | 24.86 | 240 | 294 | 243 | 298 |
| 56 | 20.0 | 50.0 | 2.51 | 20.06 | 225 | 283 | 219 | 261 |

Examples 57–59

Composite material of the present invention; varying $SiO_2/Na_2O$; ions: $H_3O^+$ spray dried Composite materials were prepared according to the process of the present invention as follows. Two hundred grams of material from each of Examples 1, 3, and 6, were slurried in 1000 milliliters of $DI^2$-water containing various amounts of HCl, as described in Table 7, for 15 minutes. Each slurry was then introduced into a spray tower by either a wheel atomizer or a nozzle atomizer using an inlet temperature of 150° to 300° C., an outlet temperature of 50° to 100° C., and a feed rate of 10 to 75 cc/min, depending on the particular product processed. Product from the main chamber and cyclone chamber were combined. X-ray diffraction revealed that a kanemite phase was present in all cases.

Hardness ion binding performance and the $SiO_2/Na_2O$ ratio of the hydrated layered silicate composite products can be found in Table 7. It should be noted that the $SiO_2/Na_2O$ ratios of the resulting products did not change from the original $SiO_2/Na_2O$ ratios since the material was spray dried. This is in contrast to previous examples where the products were crystallized and filtered resulting in the removal of some soluble material in the supernatant liquid during the filtering step.

It can be concluded from this example and the above-mentioned examples, 7 to 52, that the hardness ion binding performance is dependent on the processing of the hydrolyzed product. Specifically, comparing example 7 to example 57, and example 30 to example 58, the $SiO_2/Na_2O$ ratios of the resulting products are very similar, but the properties of the materials differ. The magnesium ion binding capacity of the spray dried materials (examples 57 and 58) is much higher than the magnesium ion binding capacity of the crystallized and filtered materials (examples 7 and 30). However, the calcium ion binding capacity of the spray dried materials (examples 57 and 58) is much lower than the calcium ion binding capacity of the crystallized and filtered materials (examples 7 and 30). Thus the processing of the material dictates the properties of the resulting product.

Example 60

Synthetic Pure Kanemite

Synthetic pure kanemite was prepared according to the literature (Beneke and Lagaly, Am. Miner. 62, 763 1977). One mole of $SiO_2$ was dispersed in 100 milliliters of methanol. To this dispersion, a solution containing one mole of NaOH dissolved in 35 milliliters was slowly added to ensure that the temperature of the sodium hydroxide/silica dispersion did not rise above room temperature. The resulting sodium hydroxide/silica slurry was dried at 100° C. The dried mixture was heated to 700° C. for 5.5 hours. The product was pulverized by ball milling. X-ray diffraction revealed that delta-phase disilicate was present.

Twenty grams of this delta-phase disilicate product were slurried in 100 milliliters of $DI^2$-water for 5 minutes followed by filtering and air drying at ambient conditions. The final product was pulverized by ball milling. X-ray diffraction revealed that a pure kanemite phase was present.

Example 61

Hydrated Layered Tetrasilicate

A hydrated layered tetrasilicate was crystallized from a liquid silicate solution having a composition of $SiO_2/Na_2O$ of 3.22 and a solids content of 25% by heating to 100° C. for 5 days according to Wegst and Wills (U.S. Pat. No. 2,179,806 and Re. U.S. Pat. No. 23,043). The product was recovered from the solution by filtering and drying at ambient conditions. X-ray diffraction revealed that a kanemite phase was present.

Comparison of the hardness ion binding performance for the product from Example 60 to Examples 9, 57, and 61 indicates that the chemistry and processing history of these products are important factors, as seen in Table 8. In particular, the hardness ion binding performance of the pure kanemite (shown in Example 60) is approximately 10% lower in calcium capacity and approximately 35% lower in magnesium capacity when compared to Example 9 and approximately 17% lower in calcium capacity and approxi-

TABLE 7

Hardness Ion Performance of Spray Dried Products

| Example No. | Feedstock from Example No. | meq $H_3O^+$ per gram of anhydrous product (acid used was 2N HCl) | $SiO_2/Na_2O$ | LOI % | CER | CEC | MgER | MgEC |
|---|---|---|---|---|---|---|---|---|
| 57 | 1 | 1.5 | 2.0 | 24.39 | 305 | 315 | 347 | 397 |
| 58 | 3 | 0.5 | 3.22 | 9.13 | 225 | 280 | 242 | 283 |
| 59 | 6 | 3.0 | 1.5 | 13.20 | 369 | 377 | 433 | 458 | mately 40% lower in magnesium capacity when compared to example 57.

TABLE 8

Comparison of Hardness Ion Binding Performance at 25° C. of Hydrated Layered Silicate Products (from Examples 9 and 57) to Previously Reported Kanemite Products (from Examples 60 and 61)

| Example No. | $SiO_2/Na_2O$ Ratio | CER | CEC | MgER | MgEC |
|---|---|---|---|---|---|
| 9 | 2.45 | 238 | 291 | 331 | 370 |
| 57 | 2.0 | 305 | 315 | 347 | 397 |
| 60 | 3.36 | 200 | 260 | 120 | 240 |
| 61 | 4.29 | 140 | 210 | 65 | 115 |

Comparison of the hardness ion binding performance for this product to Example 9, 57 and 60 indicates that the chemistry and processing history of these products are important factors, as seen in Table 8. In particular, the hardness ion binding performance of the hydrothermal crystallized kanemite (Example 61) is approximately 28% lower in calcium capacity and approximately 69% lower in magnesium capacity when compared to example 9 and approximately 33% lower in calcium capacity and approximately 71% lower in magnesium capacity when compared to example 57.

The hardness ion binding performance for calcium and magnesium of products produced in Examples 9, 57, 60 and 61 was determined as a function of temperature. The results are summarized in Table 9. These results indicate that hydrated layered silicate composite materials of this invention (Examples 9 and 57) have superior hardness ion binding performances compared to previously reported kanemite materials (i.e. Examples 60 and 61). Over the temperature range of 10° C. to 60° C., the hardness ion binding performance for the composite materials of this invention, Examples 9 and 57, are generally 15% and higher in calcium capacity and 50% higher in magnesium capacity than kanemites prepared according to prior art references (Examples 60 and 61). It is especially important to note that the hydrated layered silicate/amorphous silicate composite materials of the present invention are very active at low temperatures which are encountered in today's laundering baths.

TABLE 9

Effect of Temperature on Hardness Ion Performance for Hydrated Layered Silicate versus Other Kanemite Materials

| Product from Example No. | Temperature (°C.) | CER | CEC | MgER | MgEC |
|---|---|---|---|---|---|
| 9 | 10 | 225 | 275 | 265 | 340 |
|   | 25 | 238 | 291 | 331 | 370 |
|   | 60 | 300 | 305 | 450 | 470 |
| 57 | 10 | 285 | 290 | 225 | 250 |
|   | 25 | 305 | 315 | 347 | 397 |
|   | 60 | 315 | 325 | 380 | 405 |
| 60 | 10 | 145 | 240 | 30 | 45 |
|   | 25 | 200 | 260 | 120 | 240 |
|   | 60 | 245 | 285 | 160 | 275 |
| 61 | 10 | — | — | — | — |
|   | 25 | 140 | 210 | 65 | 115 |
|   | 60 | — | — | — | — |

The influence of pH on the hardness ion binding performance was determined for the product from Example 9 by measuring the calcium and magnesium binding performance at various pH values. The low pH values were maintained by adding an appropriate amount of HCl to the calcium and magnesium solutions. The higher pH values were maintained by adding an appropriate amount of $NH_4OH/NH_4Cl$ buffer solution. The results are summarized in Table 10. These results indicate that the product of the present invention has excellent hardness ion binding performance over a range of pH conditions. It should be noted that the hardness ion binding performance of the product of the present invention performs well in a pH range common for detergent wash conditions.

TABLE 10

Effect of pH on Hardness Ion Binding Performance at 25° C.

| | Product from Example 57 | |
|---|---|---|
| pH | CEC | MgEC |
| 8.5–9.0 | 252 | 255 |
| 9.0–9.5 | 272 | 275 |
| 9.5–10 | 282 | 305 |
| 10 | 315 | 397 |

The buffering capacities of products from Examples 9, 60 and 61 were measured by titration with 0.1 N HCl. The titrations were performed at 25° C. on a Mettler DL-70 autotitrator. Sample weights were on a equal anhydrous weight basis, 0.2 grams, and the samples were slurried in 50 ml of $DI^2$-$H_2O$. The results are summarized in Table 11. These results indicate that the product from Example 9 buffers more effectively in a pH range of 8 to 10, a commonly used pH range in home laundering, than the products from examples 60 and 61.

TABLE 11

Buffering Capacity of Hydrated Layered Silicate Material and Other Kanemite Materials

| Volume of 0.1N HCl Added (ml) | Product from Example 9 pH | Product from Example 62 pH | Product from Example 63 pH |
|---|---|---|---|
| 0 | 11.235 | 10.293 | 10.068 |
| 3.428 | 10.302 | 9.098 | 6.802 |
| 5.142 | 9.968 | 8.853 | 6.175 |
| 6 | 9.832 | 8.778 | 5.463 |
| 6.5 | 9.759 | 8.600 | 4.810 |
| 7 | 9.685 | 8.325 | 3.659 |
| 7.5 | 9.606 | 8.264 | — |
| 8 | 9.531 | 7.899 | — |
| 9 | 9.379 | 7.191 | — |
| 10 | 9.220 | 6.420 | — |
| 11 | 9.088 | 5.733 | — |
| 12 | 8.982 | 5.076 | — |
| 13 | 8.859 | 4.161 | — |
| 14 | 8.770 | — | — |
| 15 | 8.500 | — | — |
| 16 | 7.880 | — | — |

The hardness ion binding performance was determined for mixtures of the product of the present invention (Example 9) and zeolite NaA at 25° C. The results are summarized in Table 12. These results show that the products of this invention are much more efficient ion exchange materials for magnesium than zeolite NaA. These results also show that a combination of zeolite NaA with the products of the present invention have an attractive capacity for both hardness ions. For mixtures of hydrated layered silicate/amorphous silicate composite and zeolite NaA containing 60–80% of the hydrated layered silicate composite, the magnesium capacity increased by 300% compared to pure zeolite NaA.

TABLE 12

Hardness Ion Performance for Mixtures of Hydrated Layered Silicate and Zeolite NaA

| Product from Example 9 (%) | Zeolite NaA (%) | CER | CEC | MgER | MgEC |
|---|---|---|---|---|---|
| 0 | 100 | 255 | 293 | 43 | 85 |
| 20 | 80 | 279 | 289 | 106 | 164 |
| 40 | 60 | 291 | 291 | 164 | 222 |
| 60 | 40 | 291 | 293 | 240 | 288 |
| 80 | 20 | 299 | 304 | 291 | 341 |
| 100 | 0 | 238 | 291 | 331 | 370 |

Stability of the hydrated layered silicate/amorphous silicate composites of this invention to high humidity was determined by storing a physical blend of 4 pbw composite material from example 9 and 6 pbw of a commercial detergent in a 80% relative humidity environment at room temperature for a period of 3 months. Stability of delta-phase disilicate, an anhydrous crystalline material, was also determined at the same physical blend proportions and relative humidity conditions. Stability is defined as the degree of clumping or caking of the blend that occurs after storage at these conditions. After 3 months, the physical blend of the product from Example 9 and the commercial detergent remained a free flowing powder whereas the blend of delta-phase disilicate and the commercial detergent began to clump and cake after 2 weeks. The delta-phase disilicate/commercial detergent mixture eventually became a dilatent mass during the 3 month storage period.

Crystallinity of several of the hydrated layered silicate/amorphous silicate composites of this invention were determined using standard analytical X-ray diffraction methods. Example 60 was used as the X-ray diffraction standard and assigned a crystallinity value of 100%. The percent crystallinity was based on the peak areas under the following 8 peak positions: 2.48 Å, 3.09 Å, 3.16 Å, 3.44 Å, 3.64 Å, 4.01 Å, 5.13 Å, and 10.3 Å. The results for various products of this invention are shown in Table 13. It is evident that the percent crystallinity, which is a measure of the amount of kanemite present, depends on the process history of the sample.

TABLE 13

Crystallinity of Various Hydrated Layered Silicate/Amorphous Silicate Composites

| Example No. | Percent Crystallinity |
|---|---|
| 60 (Standard) | 100% |
| 9 | 62% |
| 18 | 81% |
| 30 | 47% |

Examples 62–64

A hydrated layered silicate/amorphous silicate composite, according to the process of the present invention, was prepared by slurrying 20 grams of product from Example 1 in 300 ml of DI$^2$ water containing 0.6 meq of hydronium ions per gram of anhydrous product, as described in Table 14, for 2 minutes, followed by filtering and drying at ambient conditions. The product was pulverized by ball milling. X-ray diffraction revealed that a kanemite was present. Hardness ion binding performance was independent of the source of the hydronium ion.

TABLE 14

Hydrated Layered Silicates Synthesized by the Hydrolysis of Product from Example 1 Using Different Sources of Hydronium Ions at Equivalent Hydronium Ion Concentrations

| Example No. | Feedstock from Example No. | Mineral Acid | Meq $H_3O^+$ per gram of Anhydrous Product | LOI (%) | CER | CEC | MgER | MgEC |
|---|---|---|---|---|---|---|---|---|
| 62 | 1 | Sulfuric Acid (36N) | 0.6 | 23.8 | 225 | 285 | 311 | 349 |
| 63 | 1 | Nitric Acid (16N) | 0.6 | 20.1 | 230 | 277 | 324 | 355 |
| 64 | 1 | Phosphoric Acid (15N) | 0.6 | 22.9 | 220 | 275 | 305 | 345 |
| 9 | 1 | Hydrochloric Acid (2N) | 0.6 | 22.6 | 238 | 291 | 331 | 370 |

What is claimed is:

1. A process for producing a crystalline hydrated layered sodium silicate/amorphous sodium silicate composite product comprising:

producing a material including a crystalline disilicate by heating a sodium silicate for a time, and at a temperature sufficient to crystallize at least a portion of said material; and slurrying said resulting solid material with a hydrolyzing agent providing up to 50.0 milliequivalents of ions selected from $H_3O^+$ and $OH^-$ ions per gram of material to hydrolyze said material.

2. The process of claim 1 wherein said crystalline disilicate is delta-phase disilicate.

3. The process of claim 1 wherein said crystalline disilicate is alpha-phase disilicate.

4. The process of claim 2 wherein said ions are $H_3O^+$ ions.

5. The process of claim 2 wherein said ions are $OH^-$ ions.

6. The process of claim 4 wherein said hydrolyzing agent provides up to 5.0 milliequivalents of $H_3O^+$ ions per gram of material and said sodium silicate has a $SiO_2:Na_2O$ ratio of 2.0 prior to heating.

7. The process of claim 4 wherein said hydrolyzing agent provides up to 5.0 milliequivalents of $H_3O^+$ ions per gram of material and said sodium silicate has a $SiO_2:Na_2O$ ratio of 2.4 prior to heating.

8. The process of claim 4 wherein said hydrolyzing agent provides up to 5.0 milliequivalents of $H_3O^+$ ions per gram of material and said sodium silicate has a $SiO_2$:$Na_2O$ ratio of 3.22 prior to heating.

9. The process of claim 5 wherein said hydrolyzing agent provides up to 50 milliequivalents of $OH^-$ ions per gram of material and said sodium silicate has a $SiO_2$:$Na_2O$ ratio of 2.0 prior to heating.

10. The crystalline hydrated layered sodium silicate/amorphous sodium silicate composite product produced by the process of claim 6, wherein said composite product has a $SiO_2/Na_2O$ ratio between 2.2 and 3.3, and a hardness ion binding capacity of up to 5.9 milliequivalents $Ca^{2+}$ per gram of anhydrous product and up to 7.4 milliequivalents $Mg^{2+}$ per gram of anhydrous product.

11. The crystalline hydrated layered sodium silicate/amorphous sodium silicate composite product produced by the process of claim 7, wherein said composite product has a $SiO_2/Na_2O$ ratio between 3.9 and 5.4, and a hardness ion binding capacity of up to 5.9 milliequivalents $Ca^{2+}$ per gram of anhydrous product and up to 5.8 milliequivalents $Mg^{2+}$ per gram of anhydrous product.

12. The crystalline hydrated layered sodium silicate/amorphous sodium silicate composite product produced by the process of claim 8, wherein said composite product has a $SiO_2/Na_2O$ ratio between 4.4 and 9.4, and a hardness ion binding capacity of up to 5.7 milliequivalents $Ca^{2+}$ per gram of anhydrous product and up to 1.0 milliequivalents $Mg^{2+}$ per gram of anhydrous product.

13. The process of claim 3 wherein said hydrolyzing agent provides up to 5.0 milliequivalents of $H_3O^+$ ions per gram of material and said sodium silicate has a $SiO_2$:$Na_2O$ ratio of 2.0 prior to heating.

14. The crystalline hydrated layered sodium silicate/amorphous sodium silicate composite product produced by the process of claim 13, wherein said composite product has a $SiO_2/Na_2O$ ratio between 3.4 and 4.5, and a hardness ion binding capacity of up to 3.0 milliequivalents $Ca^{2+}$ per gram of anhydrous product and up to 4.7 milliequivalents $Mg^{2+}$ per gram of anhydrous product.

15. The process of claim 4 including, after hydrolyzing, the further step of spray drying said hydrolyzed material.

16. The process of claim 15 wherein said hydrolyzing agent is calculated to provide up to 5.0 milliequivalents of $H_3O^+$ ions per gram of material and said sodium silicate has a $SiO_2$:$Na_2O$ ratio of up to 3.22 prior to heating.

17. The crystalline hydrated layered sodium silicate/amorphous sodium silicate composite product produced by the process of claim 16, wherein said composite product has a $SiO_2/Na_2O$ ratio up to 3.22, and a hardness ion binding capacity of up to 7.6 milliequivalents $Ca^{2+}$ per gram of anhydrous product and up to 9.2 milliequivalents $Mg^{2+}$ per gram of anhydrous product.

18. The crystalline hydrated layered sodium silicate/amorphous sodium silicate composite product produced by the process of claim 9, wherein said composite product has a $SiO_2/Na_2O$ ratio between 2.50 and 3.25, and a hardness ion binding capacity of up to 6.75 milliequivalents $Ca^{2+}$ per gram of anhydrous product and up to 6.25 milliequivalents $Mg^{2+}$ per gram of anhydrous product.

19. A process for producing a crystalline hydrated layered sodium silicate/amorphous sodium silicate composite product comprising:

calcining an amorphous sodium silicate material having a $SiO_2/Na_2O$ ratio of 1.5 to 3.22 and a water content up to 95% by heating to 600°–800° C. for up to 24 hours;

milling said calcined material to produce particles of less than 200 microns;

hydrolyzing said solid calcined material by slurrying said solid calcined material with an acidic or alkaline medium using 0 to 20 meq of $H_3O^+$ or $OH^-$ per gram of calcined material;

filtering and drying said hydrolyzed calcined material at a temperature up to 150° C.

* * * * *